United States Patent

[11] 3,601,553

[72] Inventors Dexter P. Cooper, Jr.
Pasadena;
Arthur Rak, Huntington Beach, both of, Calif.
[21] Appl. No. 56,803
[22] Filed July 21, 1970
[45] Patented Aug. 24, 1971
[73] Assignee Bell & Howell Company
Chicago, Ill.

[54] INFORMATION REPLAY APPARATUS
4 Claims, 4 Drawing Figs.

[52] U.S. Cl. ....179/100.1 PS, 179/100.2 S, 179/100.2 Z, 274/4 C
[51] Int. Cl. ....G11b 27/12
[50] Field of Search.... 179/100.1 PS, 100.2 S, 100.2 Z, 100.3 D; 274/4 B, 4 C, 11 B; 352/72, 78, 92

[56] References Cited
UNITED STATES PATENTS

| | | | |
|---|---|---|---|
| 2,396,409 | 3/1946 | Berzer | 179/100.2 S |
| 2,683,568 | 7/1954 | Lindsay | 179/100.2 S |
| 2,913,538 | 11/1959 | Genevay | 179/100.2 S |
| 3,051,777 | 8/1962 | Lemelson | 178/6.6 |

*Primary Examiner*—Richard Murray
*Attorney*—Luc P. Benoit

ABSTRACT: An apparatus for selectively replaying a number of features recorded on a recording tape having a casing has an adjustable memory register on the casing for preselecting features for replay. The apparatus further includes a selectively actuable device for overriding the memory register in order to bypass a preselected feature.

INVENTORS,
DEXTER P. COOPER, JR.
ARTHUR RAK
BY
ATTORNEY

INVENTORS
DEXTER P. COOPER, JR.
ARTHUR RAK
BY
ATTORNEY

INVENTORS,
DEXTER P. COOPER, JR.
ARTHUR RAK
BY
ATTORNEY

INFORMATION REPLAY APPARATUS

CROSS-REFERENCES TO RELATED APPLICATIONS

Part of the subject matter herein disclosed is claimed and/or disclosed in the following copending patent applications which are assigned to the assignee of the subject application and which herewith are incorporated by reference herein:

Ser. No. 873,288, Information Replay Methods and Apparatus, filed on Nov. 3, 1969, by Peter G. Peterson;

Ser. No. 873,250, Information Replay Methods and Apparatus, filed on Nov. 3, 1969, by Arthur Rak; and Ser. No. 873,289, Information Replay Methods and Apparatus, filed on Nov. 3, 1969, by Dexter P. Cooper and Arthur Rak.

BACKGROUND OF THE INVENTION

1. Field of the Invention

The subject invention relates to information recording and replay, and, more particularly, to methods and apparatus for controlling the replay of a number of recorded features.

2. Description of the Prior Art

Throughout the years it has become customary to record several not necessarily interrelated features on the same recording medium. A typical although by no means exclusive case is the long play record which has several musical pieces recorded on each side. More recently, prerecorded magnetic tapes have been appearing on the market having a plurality of features recorded thereon.

These types of records and prerecorded tapes are generally well liked but have the frequency felt drawback that the selection of features provided by the produced does not always correspond to the listener's choice.

To overcome this drawback, dialing equipment has been provided which permits the listener to select certain of the features for replay. While prior art equipment of this type is capable of saving people from the tedium of having to listen to unwanted features, it generally requires in its operation considerable repetitive effort on the part of the listener.

Briefly, a suitable type of playback apparatus designed in accordance with relevant prior art principles would have a manually actuable pushbutton or dial-type selector by means of which recorded features could be preselected for replay preparatory to each playback operation. The flexible preselection facility thus provided is well adapted to situations in which the typical audience is composed of a large number of people most of which wish to make their own selection of features.

In recent years, great strides have been made in making prerecorded tape selections, as well as economic tape recording equipment, available to the individual. In the case of individually owned and operated prerecorded or self-recorded feature selections, a highly flexible preselection facility becomes a burden, rather than an advantage. In such situations, the individual in question is generally slow to change his opinion as to which features he wishes to listen to and which features he wishes to exclude from a playback of the record or tape. This being the case, an actuation of selector equipment prior to each replay of a recorded selection for the mere purpose of repeating the indication of an already predetermined choice becomes a rather cumbersome shore which significantly derogates from the listener's enjoyment.

On the other hand, it often happens that an individual wishes to skip a feature which he otherwise likes but does not wish to replay for some reason at the particular time. In this case, on-the-spot flexibility of control would again be desirable.

SUMMARY OF THE INVENTION

The subject invention provides a playback control that at once saves the chore of repetitious preselection and yet preserves the possibility of momentary changes.

Pursuant to this objective, the subject invention provides apparatus for selectively replaying a number of features recorded on a recording tape having a casing, comprising in combination an adjustable memory register on said recording tape casing for selectively indicating different preselections of said features for replay, means operatively associated with said recording tape for effecting replay operations on said features, control override means selectively actuable between first and second states, and control means connected to said replay means and responsive to the state of adjustment of said memory register and state of actuation of said control override means for controlling said replay operations to effect replay of the preselection of features indicated by said memory register when said control override means are in said first state, and to effect a change in the replay of the preselection of features in response to actuation of said control override means to said second state.

In accordance with a preferred embodiment of the subject invention, said memory register on said recording tape casing includes adjustable markings for selectively indicating which of said features are to be replayed and which of said features are to be bypassed, and said control means include means for controlling said replay operations to effect replay of the features indicated for replay by said markings of said memory register when said control override means are in said first state, and to effect a bypass of features indicated for bypass by said markings of said memory register, and further to effect a bypass of a feature or of the remainder of a feature when said control override means are actuated to said second state.

In accordance with yet another preferred embodiment of the subject invention, said memory register on said recording tape casing includes adjustable markings for selectively indicating which of said features are to be replayed and which of said features are to be bypassed, said replay operations means include means for selectively advancing said recording tape at a playback speed and playing back a feature from said recording tape while said recording tape is advanced at a playback speed, and for alternatively advancing said recording tape at a fast forward speed, more rapid that said playback speed, and for suspending a playback of features when said recording tape is advanced at a fast forward speed, and said control means include means for causing said replay operations means to selectively advance said recording tape at said playback speed and playing back a feature from said recording tape when the markings of said memory register indicate the particular feature for replay and when said control overrides means are in said first state, and for causing said replay operations means to advance said recording tape at said fast forward speed and to suspend said playback when the markings of said memory register indicate the particular feature for bypass, and for further causing said replay operations means to advance said recording tape at said fast forward speed and to suspend said playback when said control override means are actuated to said second state.

In accordance with a similar preferred embodiment of the subject invention, the latter control override means include momentarily actuable override initiation means for initiating a said advance of said recording tape at said fast forward speed and suspension of said playback, and override holding means connected to said override initiation means for continuing said fast forward speed advance of said recording tape and said playback suspension for the remainder of the feature with respect of which said override initiation means have been actuated.

While the subject disclosure is primarily styled in terms of magnetic sound recordings, it is not intended to be so limited. For instance, the subject invention is also applicable to a selective display of video tape recordings, filmed motion pictures and similar features. Accordingly, the expression "recording tape" as herein employed is intended to be broad enough to cover at least magnetic recording tape as well as motion picture film. Similarly, the expression "casing" as used herein is intended to cover at least tape or film cartridges, cassettes or reels.

BRIEF DESCRIPTION OF THE DRAWINGS

The invention will become more readily apparent from the following detailed description of preferred embodiments thereof, illustrated by way of example in the accompanying drawings, in which.

DESCRIPTION OF PREFERRED EMBODIMENTS

Figures 1, 2:
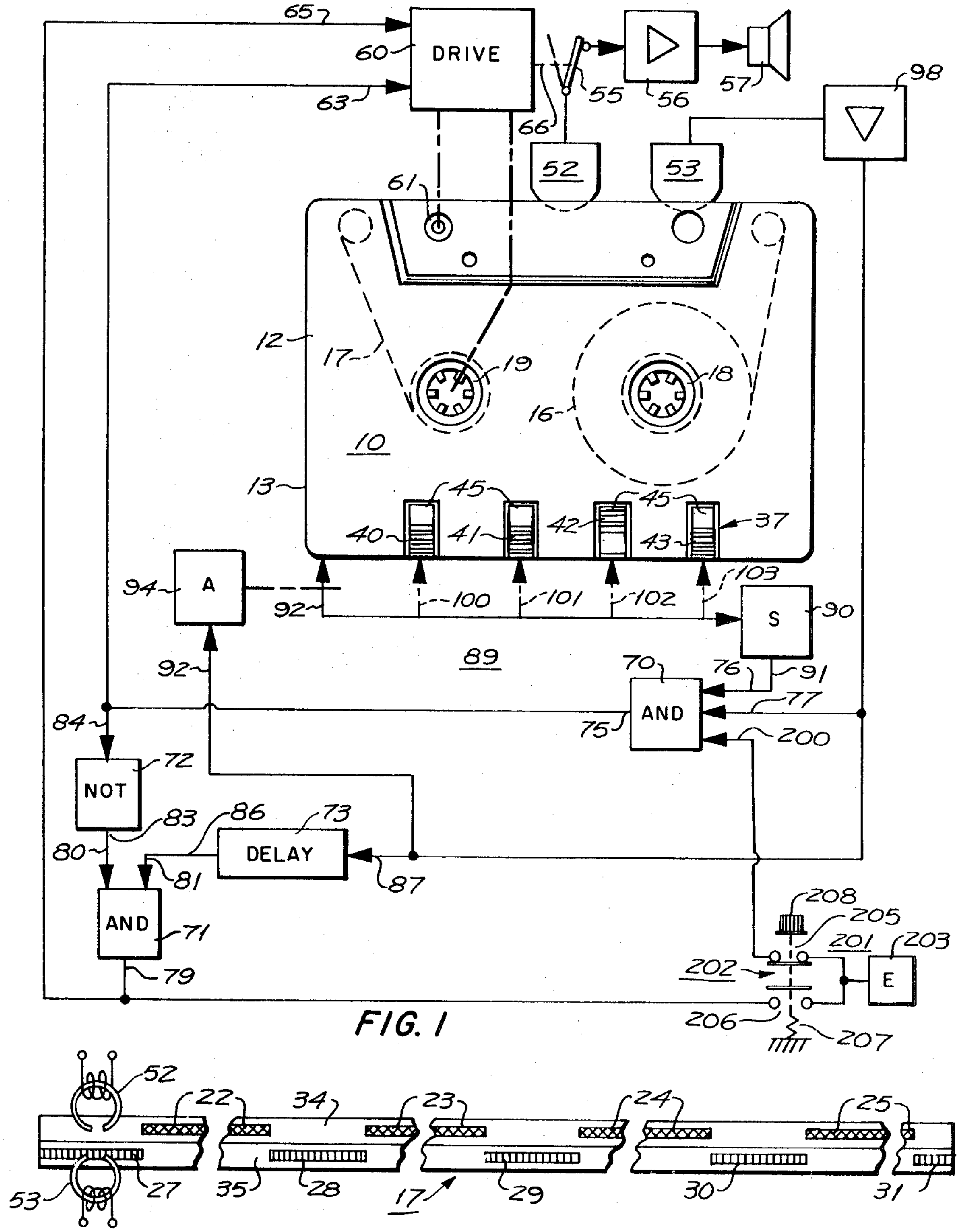
FIG. 1 is a plan view of a tape cassette and a diagrammatic showing of playback control equipment in accordance with a preferred embodiment of the subject invention.
FIG. 2 is a diagrammatic view of a tape for use in the apparatus of FIG. 1.
Figure 3:
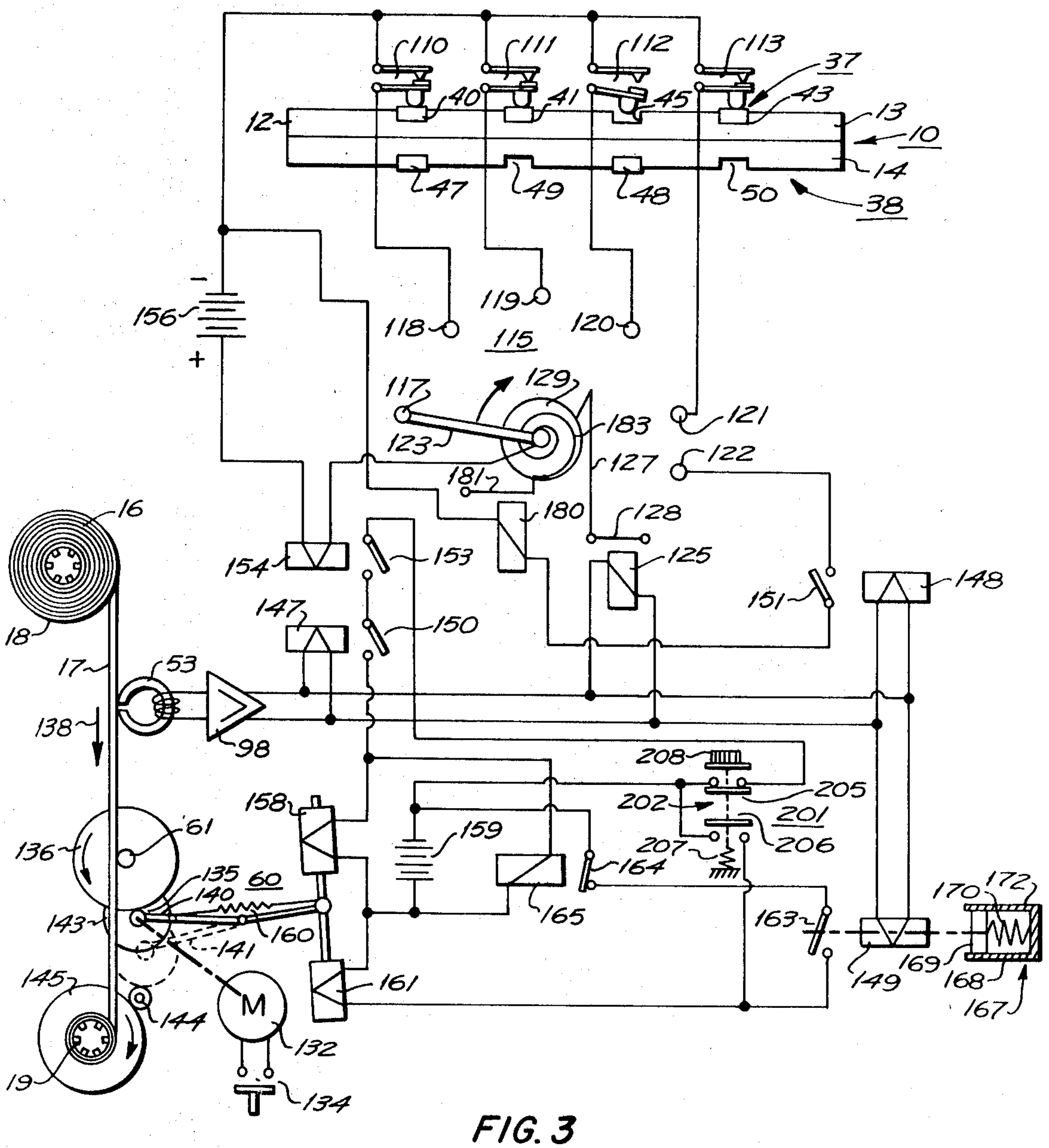
FIG. 3 is an end view of a tape cassette shown in FIG. 1, and a schematic view of related circuitry in accordance with a preferred embodiment of the subject invention.
Figure 4:
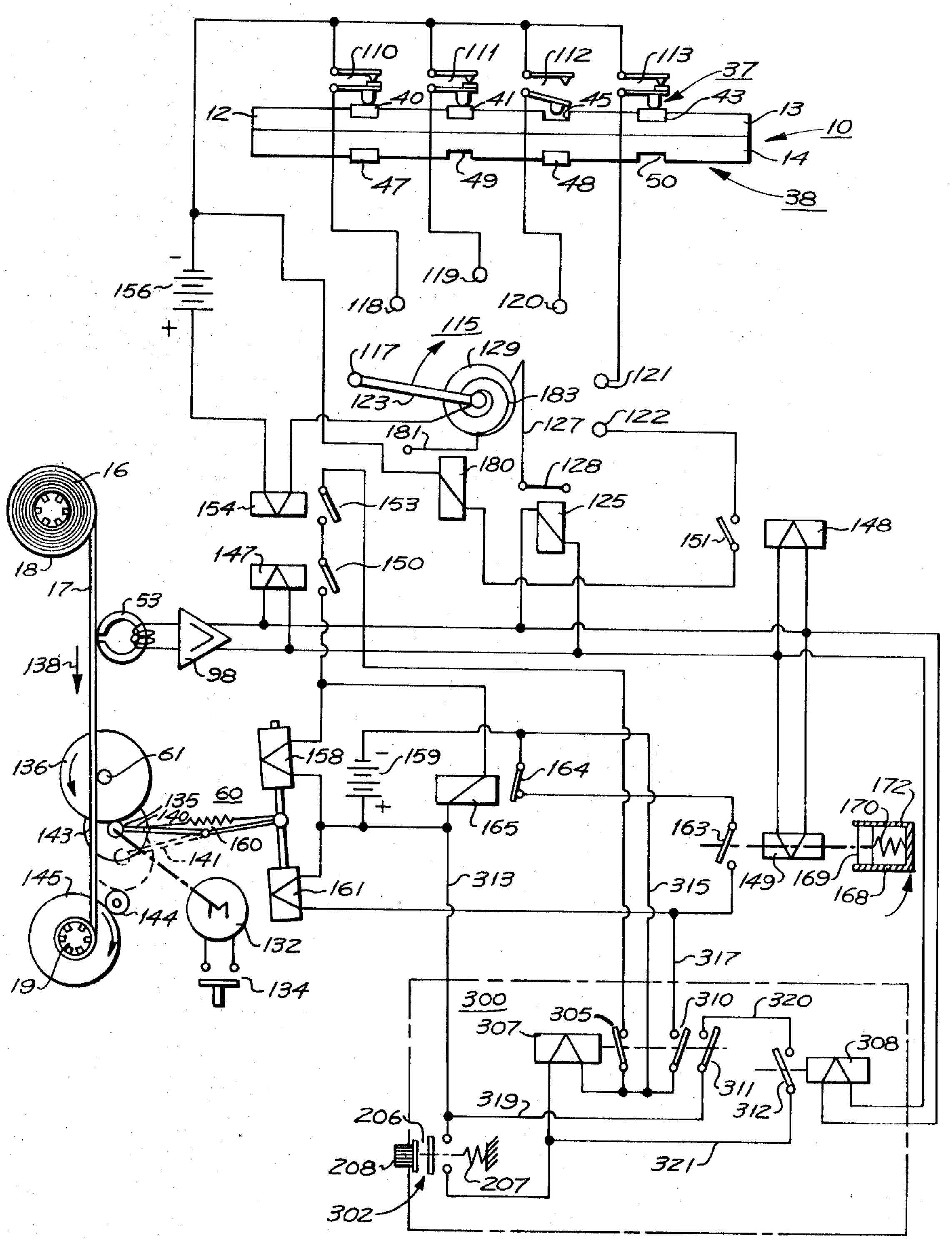
FIG. 4 illustrates a modification of the apparatus of FIG. 3, including a self-holding control override circuit in accordance with a further preferred embodiment of the subject invention.

The tape cassette 10 shown in FIGS. 1, 3 and 4 has a casing 12 composed of two mating halves 13 and 14. The casing 12 houses a supply 16 of magnetic recording tape 17 which may be wound from a tape supply retention member 18 onto a tape takeup member 19.

As indicated in FIG. 2 a number of features 22, 23, 24 and 25, such as musical presentations, is recorded on the tape 17. A number of control signals 27, 28, 29, 30 and 31 is also recorded on the tape 17. Depending on the use to which these control signals are put, they may for instance be said to indicate the beginning or the end of each feature or generally to aid in the selection of features.

In practice, the tape 17 preferably has features recorded in at least two recording channels (or in two double track stereo channels) to permit the playback of information in both directions of tape travel. Each such channel is then provided with its own control signals which are either recorded in a control track or which are recorded in one or more feature channels and arranged or coded so as not to interfere unduly with the playback of recorded features (see Pat. application Ser. No. 814,110, "Control Signal Recording," filed Apr. 7, 1969, by Dexter P. Cooper, Jr., and assigned to the subject assignee). For the purpose of simplicity, however, only one recording channel 34 with accompanying control signal track 35 is shown in FIG. 2.

As seen in FIGS. 3 and 4 two adjustable memory registers 37 and 38 are provided on the casing 12 to permit a preselection of features for replay in either direction of tape movement. As seen in FIG. 1 the register 37 comprises tabs 40, 41, 42 and 43 which are slidably mounted in slots 45 provided in the casing half 13. The tab 40 is allocated to the feature 22 (see FIG. 2), the tab 41 to the feature 23, the tab 42 to the feature 24, and the tab 43 to the feature 25.

Each of these tabs is adjustable between a first position indicative of a preselection for replay of the feature to which the particular tab is allocated, and a second position indicative of a desire to bypass the feature to which that tab is allocated. By way of example, the tabs 40, 41 and 43 are in the first position, indicating that the features 22, 23 and 25 are to be replayed, while the tab 42 is in the second position so that the feature 24 is to be bypassed or excluded from replay.

In FIGS. 3 and 4 this is illustrated for increased clarity by showing the tabs 40, 41 and 43, but omitting an illustration of the tab 42 and showing only the slot 45 instead.

As far as the memory register 38 shown in FIGS. 3 and 4 is concerned, tabs 47 and 48 indicate that the second and the fourth features in a second recording channel are to be replayed, while slots 49 and 50 depict a choice to skip the first and third features in that channel.

According to FIG. 2, the features recorded in the channel 34 are replayed by means of a playback head 52, and the control signals in the track 35 are sensed by a playback head 53. The corresponding heads in FIG. 1 bear the same reference characters.

A switch 55 selectively connects the feature playback head 52 to a playback amplifier 56 which drives a loudspeaker 57 for an audible rendition of the replayed features. A tape drive 60 is coupled to a capstan 61 on the one hand, and to the tape takeup member 19 on the other hand. The drive 60, acting through the capstan 61, advances the tape 17 at a playback speed upon energization of the drive 60 through an input 63. By contrast, the drive 60 acts through the takeup member 19 and advances the tape 17 at a fast forward speed, in response to energization of the drive through an input 65.

A coupling 66 extending between the drive 60 and the switch 55 indicates a means for closing this switch during tape advance at playback speed, and for opening this switch during the tape advance at rapid forward speed. In this manner, the features occurring during tape advance at playback speed are replayed, while the playback of features occurring during rapid forward tape advance is skipped and does not generate noise in the loudspeaker 57.

A preferred type of control equipment for reading the memory registers 37 and 38 and correspondingly controlling playback operations will now be described with reference to FIG. 1. To this end, logical circuits representing applied Boolean algebra have been employed. These circuit blocks are well known in the art of cybernetics and automated data processing and, in the instant case, include two AND elements 70 and 71, a NOT element 72, and a DELAY element 73.

The AND element 70 only provides an output signal at 75 when all three of its inputs 76, 77 and 200 are energized. Similarly, the AND element 71 only provides an output signal at 79 when both of its inputs 80 and 81 are energized. The NOT element 72 has an output signal at 83 as long as its input 84 is not energized, and provides no output signal at 83 as long as its input 84 is energized.

The DELAY element 73 only provides a signal at 86 when its input 87 has been energized for a predetermined period of time which corresponds to the time required by a searching circuit 89 to determine the presence of a replay command.

In FIG. 1, replay commands are provided for by the positioning of the tabs 40 through 43. The searching circuit 89 comprises a sensing device 90 which provides an output signal at 91 when its feeler 92 senses the position of any of the tabs 40 through 43 in a first position. The searching circuit 89 further includes an actuator 94 which steps the feeler 92 in response to signals received at the actuator input 96.

With reference to FIGS. 1 and 2, the operation of the apparatus of FIG. 1 may be described as follows:

At the beginning of a tape replay operation, the playback head 53 picks up the control signal 27 and applies the same through a suitable playback amplifier 98 to the input 77 of the AND element 70, to the input 87 of the DELAY element 73, and to the input 96 of the actuator 94. This causes the actuator 94 to step the feeler 92 to the position 100 where it senses the location of the tab 40 in its first position. This causes the sensing device 90 to apply a signal to the AND element input 76.

Up to that time, the AND element 70 could not provide an output since its input 76 was not energized. As will become more fully apparent below, the AND element input 200 is normally energized. Accordingly, all three inputs 76, 77 and 200 being now energized, the AND element 70 provides an output signal to the input 63 of the tape drive 60 which, as mentioned above, causes advance of the tape at a playback speed.

To prevent a contradictory actuation of the drive 60 at this stage, an energization of the drive input 65 which, it will be recalled, causes tape advance at a rapid forward speed, has to be inhibited. This is accomplished by applying the output signal of the AND element 70 not only to the drive input 63 as just described, but also to the input 84 of the NOT element 72. This causes the output signal of the NOT element 72 to disappear from the input 80 of the AND element 71 so that the same cannot provide an output signal at 79.

Prior to this deenergization of the AND element input 80, the DELAY element 73 prevents an application of the played-back control signal to the input 81 of the AND element 71. To this effect, the delay imposed by the element 73 corresponds as mentioned above to the time required by the searching circuit to determine the presence of a reply command.

The drive 60 having been actuated into the playback speed mode, the switch 55 is closed by the link 66 so that the feature 22 is played back by the loudspeaker 57. The control signal 27 ends after a while, but the drive 60 is a bistable device which stays switched on, even after cessation of the input signal at 63.

After the feature 22 has been played back, the control signal 28 is picked up by the head 53. Under the operational principles detailed above, this causes the actuator to step the feeler 92 to the position 101. Since the tab 41 is also in its first position, the function of the sensing device 90 and of the logic elements 70, 71, 72 and 73 again cause the application of a signal to the drive input 63 and the inhibition of a signal application to the drive input 65. The drive 60, which is already in the playback tape advance mode from the replay of the feature 22 will thus remain in this mode so that the feature 23 is played back.

A different situation, however, arises as to the feature 24, since the location of the tab 42 in its second position indicates that the feature 24 is to be skipped. More specifically, the following occurrences take place:

The playback head 53 picks up the control signal 29, whereupon the actuator 94 steps the feeler 92 to the position 102. Since the tab 42 is in its second position, no output signal is produced by the sensing device 90 and the AND element input 76 remains deenergized. In consequence the AND element 70 is not in a position to apply a signal to the tape drive input 63. In addition, the AND element input 80 remains energized since there is no input at 84 which would cause the NOT element 72 to suspend its output at 83.

Accordingly, both inputs 80 and 81 of the AND element 71 are energized upon lapse of the short time delay imposed on the played-back control signal by the DELAY element 73. This causes the AND element 71 to apply a signal to the input 65 of the drive 60 which thereupon causes an advance of the tape 17 at a rapid forward speed and an opening of the switch 55.

In consequence, the feature 24 is rapidly bypassed and the head 53 thereupon picks up the control signal 30.

If the tab 43 were in its second position, the sensing and control process just described would repeat itself and the tape would be rapidly advanced to its end to be ready for replay in the opposite direction of tape travel. However, since the tab 43 is in its first position, the process described in connection with tabs 40 and 41 repeats itself upon a playback of the control signal 30 and the tape 17 is advanced at playback speed so that the feature 25 is replayed.

A further control signal 31 is provided at the end of the least feature to provide for an energization of the actuator 94 so that the feeler 92 is returned to its initial position preparatory to the next playback operation. The tape 17 may thereupon be played back in its opposite direction, provided features have been recorded thereon in both directions. Alternatively, the control signal 31 may be employed to institute a tape rewind operation preparatory to a selective replay of the features 22 through 25 as dictated by the position of the tabs 40 through 43.

In practice it frequently happens that the user of the playback equipment wishes to skip a feature that is otherwise indicated for playback by the position of the corresponding tab in the memory register. Of course, if such desire has a more permanent character, the user will adjust the particular tab to its second position so that the feature in question is routinely bypassed. However, if such desire is only transient or exits only as to the particular instant, the user would be better served in having a means for overriding the selection indicated by the memory register, rather than having to adjust and readjust such register. The same applies if the user decides during the playback of feature to skip the rest of that feature for the particular time.

In the apparatus of FIG. 1, a control override 201 is provided for these purposes and comprises a pushbutton switch 202 and a source of electric energy 203. The switch 202 has a pair of contacts 205 and 206. A spring 207 biases the contact 205 to a closed position and the contact 206 to an open position. The contact 205 is opened and the contact 206 is closed by depressing the pushbutton 208 of the switch 202.

The electric current source 203 is so dimensioned that it provides for a sufficient energization of the AND element input 200 to provide for an AND element output signal at 75 when the inputs 76 and 77 are also energized at the same time in the manner described above, and when the switch contact 205 is in its illustrated closed position. The current source 203 is further so dimensioned that the tape drive input 65 is energized to actuate the tape drive 60 to fast forward speed and suspension of playback (see contact 55) when the pushbutton 208 is depressed to close the normally open contact 206.

In general, this selection and dimensioning of the source 203 is a routine matter, since the energization requirements of the AND element 70 and drive 60 are readily ascertainable. Separate sources for connection to the switch contact 205 and to the switch contact 206 may, of course, be provided if the energization requirements of the tape drive input 65 are too dissimilar from those of the AND element input 200. The control override switch 202 is depressed when the user wishes to bypass one feature which the apparatus is just about to replay or which the apparatus already has started to replay. In this case, the corresponding tab (e.g. the tab 40 for the first feature) will be in its first position so that the AND element inputs 76 and 77 will be energized upon sensing of the first tab position at 92 and 90 and playback of the control signal (e.g. the control signal 27 for the first feature) by the control playback head 53.

Before the button 208 is being depressed, the AND element input 200 will also be energized, so that the AND element 70 provides an output signal that, as mentioned above, will energize the tape drive input 63 to cause advance of the tape 17 at playback speed. When the pushbutton 208 is being depressed the switch contact 206 closes and connects the source 203 to the tape drive input 65 for the institution of a fast forward tape advance operation. When this occurs while the control signal (e.g. the signal 27 for the first feature) is still present at the head 53, then the tape drive inputs 63 and 65 would receive conflicting commands; namely, one command by the AND element 70 to effect a playback operation and one command by the switch contact 206 to suspend playback and move the tape 17 forward at high speed.

To preclude malfunctions that would result from these conflicting commands, the AND element input 200 and switch contact 205 are provided. As long as the pushbutton 208 is not depressed, the AND element input 200 is continuously energized. Accordingly, a playback command to the tape drive 60 can then be produced by a simultaneous energization of the AND element inputs 76 and 77 in the manner described above.

However, as soon as the pushbutton 208 is depressed the contact 205 is opened for a deenergization of the AND input 200. Accordingly, the AND element 70 becomes disabled from providing a playback command to the tape drive 60. Since the switch contact 206 becomes closed during further downward movement of the pushbutton 208, the input 65 will be the only input of the drive 60 that is energized, and the tape 17 will accordingly be advanced at fast forward speed, with a playback being suspended through opening of the switch 55 or, perhaps more in conformity with standard practice, through withdrawal of the head 52 from the tape and opening of the switch 55.

An analog of the Boolean logic of FIG. 1 is illustrated in FIG. 3. For the sake of simplicity and ease of illustration, FIG. 3 shows the tape 17, tape coil 16 and tape retaining and takeup members 18 and 19 separately from the cassette 10 although it should be understood that these parts are contained in the casing 12. Moreover, a showing of the playback equipment 52, 56 and 57 has not been repeated in FIGS. 3 and 4. Also, it will be noted that like or functionally equivalent parts as among FIGS. 1 to 3 are designated by like reference numerals.

According to FIG. 3, the position of the tabs 40 through 43 is sensed by a bank of contacts 110, 111, 112 and 113. Each of these contacts is closed when the corresponding tab is in its first position, and is open when such tab is in its second position. Accordingly, if the illustrated tab positions prevail, the contacts 110, 111 and 113 are closed and the contact pair 112 is open as shown.

A stepping switch or selector 115 is the functional equivalent of the actuator 94 of FIG. 1. The selector 115 has a series of contacts 117 through 122 which are successively engaged by a selector arm 123 in response to repeated energization of a stepping motor 125. A dog and pawl mechanism 127 transmits the actuating force of the motor anchor 128 to a ratchet wheel 129.

Initially, the selector arm 123 rests on the quiescent state contact 117. A motor 132 in the tape drive 60 is started by actuation of an on-off switch 134. The torque of the motor 132 is transmitted to the tape capstan 61 by a pulley 135 and a flywheel 136. In consequence, the tape 17 is advanced in the direction of the arrow 138 at a playback speed.

As indicated above, the drive 60 is a bistable device. This means that the pulley mount 140 may either be in the position illustrated in solid lines or in the alternative position indicated in dotted lines 141, depending on whether the last preceding tape advance took place at playback speed or at the alternative fast forward speed. Should the pulley mount 140 happen to be in the alternative position 141, then the torque of the motor 132 would be transmitted to the tape takeup member 19 by a series of gear wheels 143, 144 and 145 for a tape advance at fast forward speed.

In either case, the first control signal 27 (see FIG. 2) is picked up by the playback head 53. Upon amplification at 98, this control signal energizes relays 147, 148 and 149 and the stepping motor 125 of the selector 115. In response to such energization, the relays 147 and 148, respectively, close their contacts 150 and 151.

Closure of the contact 150 is of no consequence at this stage since an open contact 153 of a relay 154 is connected in series with the contact 150. Those familiar with the elements of Boolean logic will recognize that the relays 147 and 154 with their contacts 150 and 153 constitute a functional analog of the AND element 70 of FIG. 1.

Closure of the contact 151 is also of no consequence at this stage and will remain of no consequence until the selector arm 123 has arrived at the contact 122 as will below be described.

Energization of the motor 125, however, causes advancement of the selector arm 123 from the contact 117 to the cont .t 118. Since the contact 110 is shown as closed in response to the location of the adjustable tab 40 in its first position, the following energization circuit for the relay 154 is established:

—Battery 156, sensing contact 110, selector contact 118, selector arm 123, relay 154, and battery 156—

This results in a closure of the relay contact 153. Since this contact is in series with the previously closed contact 150 of relay 147, the following energization circuit is established for an actuator 158:

—Battery 159, normally closed contact 205 of the switch 202, contact 153, contact 150, actuator 158, and battery 159—

If the pulley mount 140 already is in its illustrated solid position, then it remains in such position upon energization of the actuator 158. By contrast, if the pulley mount 140 is in its alternative position 141, then the actuator 158 advances the pulley mount 140 to its illustrated solid position. Since the pulley mount 140 is part of an overcenter toggle mechanism 160, the tape advance at playback speed will continue in response to an energization of the actuator 158 even if such actuator is subsequently deenergized when the contact 150 opens upon a cessation of the control signal 27. Since the same applies *mutatis mutandis* to the fast forward tape advance upon energization of the actuator 161, the bistable character of the tape drive 60 is readily appreciated.

Speaking of the fast forward actuator 161, we may note that energization of this actuator and energization of the playback tape speed actuator 158 are mutually exclusive. At first sight one might question this statement in view of the fact that the relay 149 is immediately energized upon playback of the control signal 27 (see FIG. 2) and that this relay has a contact 163 which is in series with the normally closed contact 164 of a relay 165 which, being connected in parallel to the actuator 158, is only energized upon energization of this actuator in the manner just described.

However, it should be noted at this juncture that the relay 149 includes a delay device 167 which delays the closure of the contact 163 upon energization of the relay 149. In the embodiment illustrated in FIG. 3 the delay device 167 includes a dashpot 168 with a piston 169 and a return spring 170.

Energization of the relay 149 urges the piston 169 into the dashpot 168. The ensuing movement of the piston 169 is restrained by the spring 170 and by the air in the dashpot 168. Both of these forces can be overcome by the relay 149. However, since the entrapped air can only escape from the dashpot through a small orifice 172, it takes time for the relay 149 to push the piston 169 sufficiently into the dashpot to effect a closure of the contact 163 which is coupled to the piston 169.

The orifice 172 is constructed or adjusted so that the delay imposed by the device 167 includes the time it takes for the selector 115 and accompanying circuitry to sense whether a particular one of the tabs 40 through 43 is in its first position. If so, the actuator 158 is energized as described above. This, in turn, results in an energization of the relay 165 and a consequent opening of the normally closed contact 164.

The contact 164 having been opened, a closure of the contact 163 upon expiration of the time delay imposed by the device 167 is of no consequence. On the other hand, had the actuator 158 not been energized, then the contact 164 would still be closed when the contact 163 closes and the fast forward actuator 161 would be energized rather than the playback advance actuator 158. It will now be recognized that the relay 165 with its contact 164 is a functional analog of the NOT element 72 shown in FIG. 1, while the relay 149 with its contact 163 and retardation device 167 is, of course, an analog of the DELAY device 73.

Since the tab 40 is in its illustrated first position, the actuator 158 is energized and the tape 17 is thereupon advanced at playback speed, whereupon the feature 22 (see FIG. 2) is played back by the equipment 52, 56 and 57 (see FIG. 1).

When the control signal 28 reaches the head 53 the selector arm 123 is stepped onto the contact 119 and the sensing and control process described above in connection with the sensing contact 110 repeats itself with respect to the contact 111, since the tab 41 is also in its first position. Accordingly, the tape 17 continues to be advanced at playback speed and the second feature 23 is played back.

The third control signal 29 then reaches the head 53. This causes the selector arm 123 to be stepped to the contact 120. Since the tab 42 is in its second position (see FIG. 1) the contact 112 is open so that the battery 156 is prevented from energizing the relay 154. Accordingly, the actuator 158 and the relay 165 remain deenergized. In consequence, the contact 164 will still be closed by the time the contact 163 closes upon expiration of the delay imposed by the device 167. This establishes the following energizing circuit for the fast forward actuator 161:

—Battery 159, contact 164, contact 163, actuator 161, and battery 159—

This causes actuation of the pulley mount 140 to the alternative position 141 and fast forward movement of the tape 17. This feature 24 (FIG. 2) is thus skipped inasmuch as the drive 60 maintains the switch 55 (see top of FIG. 1) open when operating in the fast forward mode.

The head 53 next encounters the control signal 30 and the selector arm 123 is stepped to the contact 121 for a sensing of the position of the tab 43. Since this tab is in the first position, the playback advance actuator 158 will be energized as was the case with respect to the tabs 40 and 41 which are also in their first position. Accordingly, the feature 25 is played back.

After completion of this playback, the control signal 31 reaches the head 53. This causes the selector arm 123 to be stepped to the contact 122, which establishes the following energization for a homing relay 180:

—Battery 156, relay 154, selector arm 123, contact 122, relay contact 151, homing relay 180, battery 156—

Since the relay 154 is in series with the homing relay 180, the contact 153 closes in series to the contact 150 which is already closed because of the presence of the control signal 31 and the head 53, and in series with the normally closed switch contact 205. Accordingly, the actuator 158 is energized and the tape is slowed down to playback speed. Of course, when the tab 43 is in its illustrated first position, then the tape already is at playback speed when the control signal 31 encounters the head 53. However, the tape would at that instant be at fast forward speed if the tab 43 had been adjusted to its second position and the feature 25 consequently skipped. In that case a slowdown of the tape by energization of the actuator 158 is beneficial since it lessens the impact of a sudden stop on the tape when the end thereof is reached.

The homing relay 180 actuates a pawl 181 which releases the ratchet wheel 129 so that the selector arm 123 can return to its quiescent state at contact 117 by action of a bias spring 183. At the same time, a further tape playback operation may be initiated for a selective playback of another series of recorded features. The homing relay 180 has a time delay so that the release pawl 181 only reengages the ratchet wheel 129 after the selector arm 123 has returned to the contact 117 and the playback of the control signal 31 has been completed.

The function of the control override 201 in the apparatus of FIG. 3 will now be considered by making the assumption that the user wishes to bypass the second feature 23 (see FIG. 2) despite of the fact that the tab 41 is in the first position and thus indicates the second feature for playback.

If the user wishes to bypass the second feature entirely, he depresses the pushbutton 208 when the first feature has been replayed. Accordingly, when the control signal 28 steps the selector arm 123 onto the selector contact 119, the battery 159 cannot energize the playback actuator 158 despite of a contemporal closure of the relay contacts 150 and 153. This inability to energize the playback actuator 158 is, of course, due to the fact that the contact 205 is open when the button 208 is depressed.

Depression of the button 208 not only opens the contact 205, thereby inhibiting a playback operation, but also closes the contact 206, thereby instituting a fast forward tape advance operation. More specifically, closure of the contact 206 establishes the following energizing circuit for the fast forward actuator 161:

—battery 159, contact 206, fast forward actuator 161, and battery 159—

In consequence, the bistable tape drive 60 is actuated to its second stable position, illustrated by dotted lines, and the tape is advanced at fast forward speed, while a playback of the particular feature is inhibited (see contact 55, FIG. 1).

The pushbutton 208 is thereupon released. Owing to the bistable nature of the tape drive 60, the tape will continue to advance at fast forward speed at least until the next feature is reached. In the illustrated examples, the third feature 24 is indicated for bypass, so that the tape advance will continue at fast forward speed until the control signal 30 for the fourth feature 25 is reached. The playback of the fourth feature will thereupon proceed in the manner described above, unless the user should again institute a fast forward tape advance operation by depressing the pushbutton 208.

The control override 201 is also suitable for terminating the playback of a feature during the course of such playback. In this case, depression of the pushbutton 208 will close the contact 206 which, in turn, will energize the actuator 161 for a fast forward advance of the tape 17 and suspension of playback during the remainder of the particular feature.

No function is performed by the switch contact 205 if the pushbutton 208 is depressed after the control signal for the particular feature has passed the control signal playback head 53. In that case, a playback operation by the drive 60 need not be inhibited, since the relay contact 150 is reopened when the control signal has passed the head 53.

Moreover, if the record of each control signal on the tape 17 is relatively short, only a momentary depression of the pushbutton 208 is generally required, since the ensuing fast forward tape advance will quickly move the control signal past the head 53.

Special problems could, however, arise if the control signals are of a type persisting for longer periods of time. In that case, there exists the possibility that the control signal is still present, and reinitiates a playback of the feature, when the pushbutton 208 is released by the user.

According to an aspect of the subject invention, this problem is solved by providing the control override with a self-holding facility. A preferred embodiment of such a modified control override 300 is shown in FIG. 4. Like reference numerals as among FIGS. 1, 3 and 4 again designate like or functionally equivalent parts, and the above description of FIG. 3 should be consulted for a fuller understanding of the common parts and circuits of the apparatus of FIG. 4.

The control override 300 of FIG. 4 includes a manually actuable switch 302 having the above mentioned switch contact 206, bias spring 207 and pushbutton 208. As before, the spring 207 biases the contact 206 to an open position, and this contact 206 is closed by depressing the pushbutton 208. In FIG. 4, the normally closed switch contact 205 is replaced by a normally closed relay contact 305.

Since the normally closed relay contact 305 is in series with the relay contacts 150 and 153, an energization of the playback actuator 158 is inhibited as long as the contact 305 is open. On the other hand, the energization of the playback actuator 158 is controlled by the relay contacts 150 and 153 as described above as long as the relay contact 305 is closed.

The control override 300 further includes two relays 307 and 308. The relay 307 has the previously mentioned normally closed relay contact 305, as well as two normally open relay contacts 310 and 311. The relay 308 closes a normally open contact 312 upon energization thereof.

The following energization circuit for the relay 307 is established upon depressing of the pushbutton 208:

—battery 159, lead 313, switch contact 206, relay 307, lead 315, battery 159—

This energization of the relay 307 opens the normally closed contact 305 so that the playback actuator 158 is deenergized or becomes incapable of control by the series-connected contacts 150 and 153. Energization of the relay 307 further closes the normally open relay contact 310 which connects the fast forward actuator 161 across the battery 159 through a circuit including lead 315, relay contact 310 and lead 317.

In this manner, depression of the pushbutton 208 causes the tape 17 to be advanced at fast forward speed and the playback of the particular feature to be suspended, thereby overriding any indication of the contrary by the memory register 37 and 38. Since the tape drive 60 is a bistable device, the fast forward tape advance condition will persist until receipt of a command to the contrary.

In general, such a countermand arises when the selector 115 senses the next feature slated for playback by a cassette memory register. As briefly indicated above, a spurious countermand could, however, arise if the pushbutton of the switch 202 of FIG. 3 is released when the particular control signal on the tape 17 is still present at the head 53; assuming the control signals to be sufficiently long to invoke such malfunction.

According to FIG. 4, each control signal 27, 28, 29, etc. (see FIG. 2) not only energizes selector motor 125 and relays 147 and 148, but also the relay 308 in the control override 300. As long as the relay contact 311 is open, an energization of the relay 308 is of no consequence. However, if the relay 307 is energized while the relay 308 is energized, then the relay contacts 311 and 312 establish the following holding circuit for the relay 307:

—battery 159, lead 313, lead 319, relay contact 311, lead 320, relay contact 312, lead 321, relay 307, lead 315, battery 159—

In this manner the relay 307 remains energized as long as the particular control signal is present at the pickup head 53, even if the pushbutton 208 is released.

Once the control signal for the particular feature has moved past the pickup head 53, the relay 308 becomes deenergized and the relay contact 312 opens. This opens the holding circuit of the relay 307 which accordingly becomes deenergized.

Owing to the bistable nature of the tape drive 60 the fast forward tape advance continues until the selector 115 senses the next indication by a cassette memory register that a feature is to be played back.

It will now be recognized that the control override 300 of FIG. 4 includes momentarily actuable override initiation means having a pushbutton switch 302 for initiating an advance of the recording tape 17 at the fast forward speed and a suspension of the feature playback, as well as override holding means including the relay 308 and relay contacts 311 and 312 for continuing the fast forward speed advance of the recording tape 17 and the feature playback suspension for the remainder of the feature with respect of which the override initiations means have been actuated.

As is apparent from FIG. 4, the continuation of the feature bypass may be effected without the necessity of an operation of the override holding means for the entire duration of the fast forward advance of the particular feature. As has been mentioned above, the relay contact 312 opens and the relay 307 is deenergized when the control signal has passed the pickup head 53. The fast forward tape advance then, nevertheless continues owing to the bistable nature of the tape drive 60.

Those skilled in the art of contemporary electronics will, of course, realize that the relay circuits shown in FIGS. 3 and 4 may be replaced by functionally equivalent solid-state circuits.

The cassette 10 is preferably provided with the adjustable tabs or other memory registers during its manufacture. However, as disclosed in the above mentioned Peterson and Cooper and Rak applications, suitable memory registers may also be provided by the user in the form of selectively attachable tabs, adhesive foil, registers, and the like. As also disclosed in these copending applications, the control signals 27, et seq. are not necessarily present as such on the tape 17. Rather, a pause sensor may be employed for sensing pauses between features and for providing a control signal in response to each sensed pause.

We claim:

1. Apparatus for selectively replaying a number of features recorded on a recording tape having a casing, comprising in combination:

an adjustable memory register on said recording tape casing for selectively indicating different preselections of said features for replay;

means operatively associated with said recording tape for effecting replay operations on said features;

control override means selectively actuable between first and second states; and control means connected to said replay means and responsive to the state of adjustment of said memory register and state of actuation of said control override means for controlling said replay operations to effect replay of the preselection of features indicated by said memory register when said control override means are in said first state, and to effect a change in the replay of the preselection of features in response to actuation of said control override means to said second state.

2. Apparatus as claimed in claim 1, wherein:

said memory register on said recording tape casing includes adjustable markings for selectively indicating which of said features are to be replayed and which of said features are to be bypassed; and said control means include means for controlling said replay operations to effect replay of the features indicated for replay by said markings of said memory register when said control override means are in said first state, and to effect a bypass of features indicated for bypass by said markings of said memory register, and further to effect a bypass of a feature or of the remainder of a feature when said control override means are actuated to said second state.

3. Apparatus as claimed in claim 1, wherein:

said memory register on said recording tape casing includes adjustable markings for selectively indicating which of said features are to be replayed and which of said features are to be bypassed;

said replay operations means include means for selectively advancing said recording tape at a playback speed and playing back a feature from said recording tape while said recording tape is advanced at a playback speed, and for alternatively advancing said recording tape at a fast forward speed, more rapid than said playback speed, and for suspending a playback of features when said recording tape is advanced at a fast forward speed; and said control means include means for causing said replay operations means to selectively advance said recording tape at said playback speed and playing back a feature from said recording tape when the markings of said memory register indicate the particular feature for replay and when said control override means are in said first state, and for causing said replay operations means to advance said recording tape at said fast forward speed and to suspend said playback when the markings of said memory register indicate the particular feature for bypass, and for further causing said replay operations means to advance said recording tape at said fast forward speed and to suspend said playback when said control override means are actuated to said second state.

4. Apparatus as claimed in claim 1, wherein:

said control override means include momentarily actuable override initiation means for initiating a said advance of said recording tape at said fast forward speed and suspension of said playback, and override holding means connected to said override initiation means for continuing said fast forward speed advance of said recording tape and said playback suspension for the remainder of the feature with respect of which said override initiation means have been actuated.